United States Patent
Akiya

(10) Patent No.: US 6,998,915 B2
(45) Date of Patent: Feb. 14, 2006

(54) APPARATUS FOR SWITCHING MATCHING CIRCUIT IN MOBILE COMMUNICATION TERMINAL

(75) Inventor: Makoto Akiya, Saitama (JP)

(73) Assignee: NEC Corporation, Tokyo (JP)

( * ) Notice: Subject to any disclaimer, the term of this patent is extended or adjusted under 35 U.S.C. 154(b) by 399 days.

(21) Appl. No.: 10/345,368

(22) Filed: Jan. 16, 2003

(65) Prior Publication Data
US 2003/0232602 A1 Dec. 18, 2003

(30) Foreign Application Priority Data
Jan. 17, 2002 (JP) .............................. 2002-008611

(51) Int. Cl.
*H01Q 11/12* (2006.01)
*H04B 1/04* (2006.01)
(52) U.S. Cl. ................ 330/127; 455/127.1; 455/550.1; 333/124; 333/17.3; 330/135
(58) Field of Classification Search .............. 455/63.3, 455/115.1, 127.1, 80, 191.3, 550.1; 333/124, 333/126, 129, 17.3; 330/135, 136
See application file for complete search history.

(56) References Cited

U.S. PATENT DOCUMENTS

| | | | | |
|---|---|---|---|---|
| 5,054,114 A | * | 10/1991 | Erickson | 455/78 |
| 5,661,438 A | * | 8/1997 | Sasaki | 330/284 |
| 5,834,988 A | * | 11/1998 | Dobrovolny | 333/81 R |
| 6,795,714 B1 | * | 9/2004 | Fickenscher et al. | 455/552.1 |
| 2001/0046880 A1 | * | 11/2001 | Hosonuma | 455/550 |
| 2002/0044016 A1 | * | 4/2002 | Hareyama | 330/51 |
| 2002/0118076 A1 | * | 8/2002 | Sharpe et al. | 333/104 |

FOREIGN PATENT DOCUMENTS

| | | |
|---|---|---|
| JP | H5-37255 A | 2/1993 |
| JP | H10-117109 A | 5/1998 |
| JP | P2001-77719 A | 3/2001 |

* cited by examiner

Primary Examiner—Simon Nguyen
(74) Attorney, Agent, or Firm—Sughrue Mion, PLLC

(57) ABSTRACT

An apparatus for switching a matching circuit in a mobile communication terminal includes a PIN diode connected in parallel to an RF signal input and output line to be turned on and off to connect and disconnect an impedance matching-element to the RF signal input and output line in accordance with a frequency band switching-signal, and a bias circuit for generating a bias voltage applied to the PIN diode in accordance with the frequency band switching-signal, thereby shifting an amplitude of an RF signal to a positive side at an off-time of the PIN diode.

8 Claims, 2 Drawing Sheets

APPARATUS FOR SWITCHING MATCHING CIRCUIT IN MOBILE COMMUNICATION TERMINAL

BACKGROUND OF THE INVENTION

1. Field of the Invention

The present invention relates to a mobile communication terminal such as a mobile telephone set provided with a transmission unit which can switch a frequency band, and more particularly to an apparatus for switching a matching circuit to connect and disconnect an impedance matching element to an RF signal input and output line in accordance with a frequency band switching-signal.

2. Prior Art

FIG. 1 shows a conventional apparatus for switching a matching circuit in a mobile communication terminal.

In FIG. 1, an RF input terminal 1 is connected with an RF output terminal 2 via a first coupling capacitor 5 and a second coupling capacitor 7 to form an RF signal input and output line. A PIN diode B for switching a frequency band is connected in parallel between the first and second coupling capacitors 5 and 7 at its cathode to the RF signal input and output line, and a grounded limitation resistance 3 is also connected in parallel thereto.

The anode of the PIN diode 8 is connected with a matching capacitor 9 as an impedance matching element and a choke coil 10 is connected in parallel to a midpoint of them, while an RF bypass capacitor 11 is connected in parallel to the choke coil 10 and a frequency band switching-signal input terminal 12 is connected in series thereto.

When the frequency band switching-signal which is input to the frequency band switching-signal input terminal 12 is H level, a voltage of the frequency band switching-signal is applied via the choke coil 10 as a DC voltage to the PIN diode 8, and the PIN diode 8 is turned on to make an impedance between the anode and the cathode low at the RF signal.

Consequently, the RF signal input and output line communicating from the RF input terminal 1 to the RF output terminal 2 is added with the matching capacitor 9, and the impedance is optimized at a selected band.

In addition, the choke coil 10 is grounded on the side of the frequency band switching-signal input terminal 12 via the RF bypass capacitor 11 so that an RF impedance becomes high on the side of the choke coil 10 at the anode of the PIN diode 8 to result in no influence on an impedance of the RF signal input and output line communicating from the RF input terminal 1 to the RF output terminal 2.

Meanwhile, when the frequency band switching-signal is L level, the PIN diode 8 is turned off and an RF impedance becomes high at the cathode of the PIN diode 8, so that the matching capacitor 9 is insulated from the RF signal input and output line communicating from the RF input terminal 1 to the RF output terminal 2, because no voltage is applied to the anode of the PIN diode 8.

In the conventional apparatus, however there is a disadvantage in that there is a time for which the PIN diode 8 is turned on during a period of an off-time by a negative amplitude of a transmission power, so that a precise switching of a frequency band is deteriorated, when a large amplitude of a transmission power is applied to the cathode of the PIN diode 8, because the RF amplitude waveform on the cathode terminal of the PIN diode 8 at an off-time is of an amplitude changing on the central axis of 0V as shown in FIG. 3.

In order to carry out a precise switching operation of a frequency band in the past, a GaAs switching-element which is very expensive must be used as a frequency band switching-element in place of a PIN diode.

SUMMARY OF THE INVENTION

Accordingly, it is an object of the invention to provide an apparatus for switching a matching circuit in a mobile communication terminal which is low in price and can switch the matching circuit precisely in any frequency band.

According to the first feature of the invention, an apparatus for switching a matching circuit in a mobile communication terminal comprises: a PIN diode connected in parallel to an RF signal input and output line to be turned on and off to connect and disconnect an impedance matching element to the RF signal input and output line in accordance with a frequency band switching-signal; and a bias circuit for generating a bias voltage applied to the PIN diode in accordance with the frequency band switching-signal, thereby shifting an amplitude of an RF signal to a positive side at an off-time of the PIN diode In accordance with a preferred embodiment of the invention, the bias circuit comprises: an inverter for inverting the frequency band switching-signal; and a limitation resistance for limiting an output current of the inverter to be applied to the PIN diode.

Further in accordance with a preferred embodiment of the present invention, the bias circuit comprises: a first limitation resistance and a second limitation resistance for dividing a voltage to be applied to a cathode of the PIN diode.

According to the second feature of the invention, an apparatus for switching a matching circuit in a mobile communication terminal comprises: an RF signal input and output line; a matching circuit for switching a frequency band of an RF signal; a switching circuit for connecting and disconnecting the matching circuit to the RF signal input and output line; and a bias circuit for adding a predetermined DC voltage to the RF signal.

In accordance with a preferred embodiment of the invention, the switching circuit is a PIN diode.

In accordance with a preferred embodiment of the invention, the bias circuit comprises: an inverter for inverting a frequency band switching-signal; and a resistance for limiting an output current of the inverter to be applied to the switching circuit.

In accordance with a preferred embodiment of the invention, the PIN diode is turned on and off by a frequency band switching-signal.

Further in accordance with a preferred embodiment of the invention, the resistance comprises: two resistances for dividing an output voltage of the inverter to be applied to the switching circuit.

According to these constructions a frequency band can be switched precisely even if a transmission power having a large amplitude is applied to the cathode of the PIN diode, because an amplitude on a negative side of the transmission power is shifted to a positive side at an off-time of a PIN diode which is connected in parallel to an RF signal input and output line by applying a direct current (DC) voltage generated in accordance with a frequency band switching-signal to the cathode of the PIN diode. Therefore, a matching circuit can be switched precisely in any frequency band by means of a simple and inexpensive circuitry in the apparatus for switching a matching circuit in a mobile communication terminal such as a mobile telephone set.

BRIEF DESCRIPTION OF THE DRAWINGS

The present invention will be explained in more detail in Conjunction with the appended drawings, wherein.

DETAILED DESCRIPTION OF THE PREFERRED EMBODIMENTS

A preferred embodiment of the invention will be explained in conjunction with the accompanying drawings.

Figure 1:
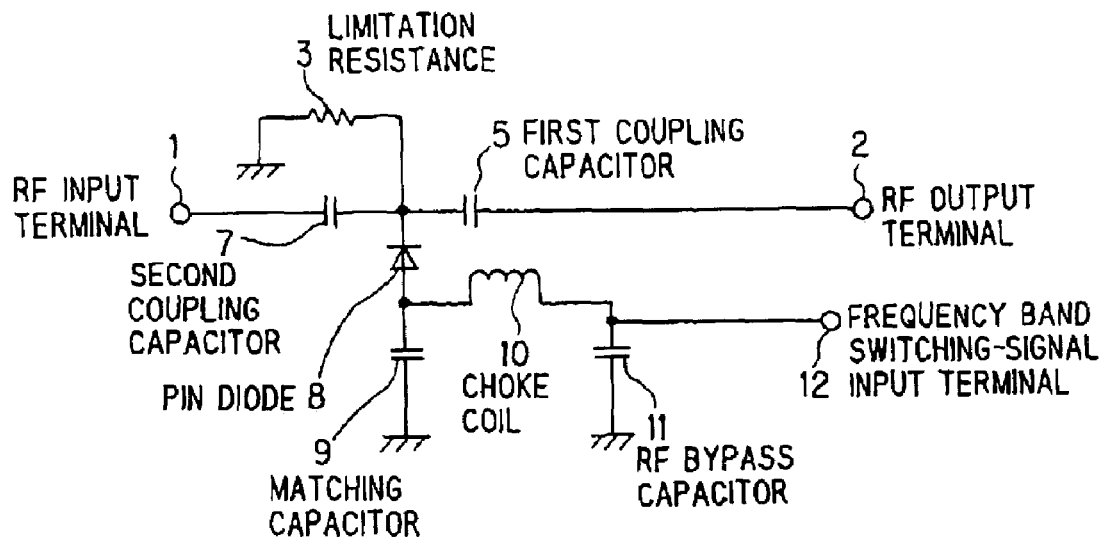
FIG. 1 is a circuit diagram showing a conventional apparatus for switching a matching circuit.
Figure 2:
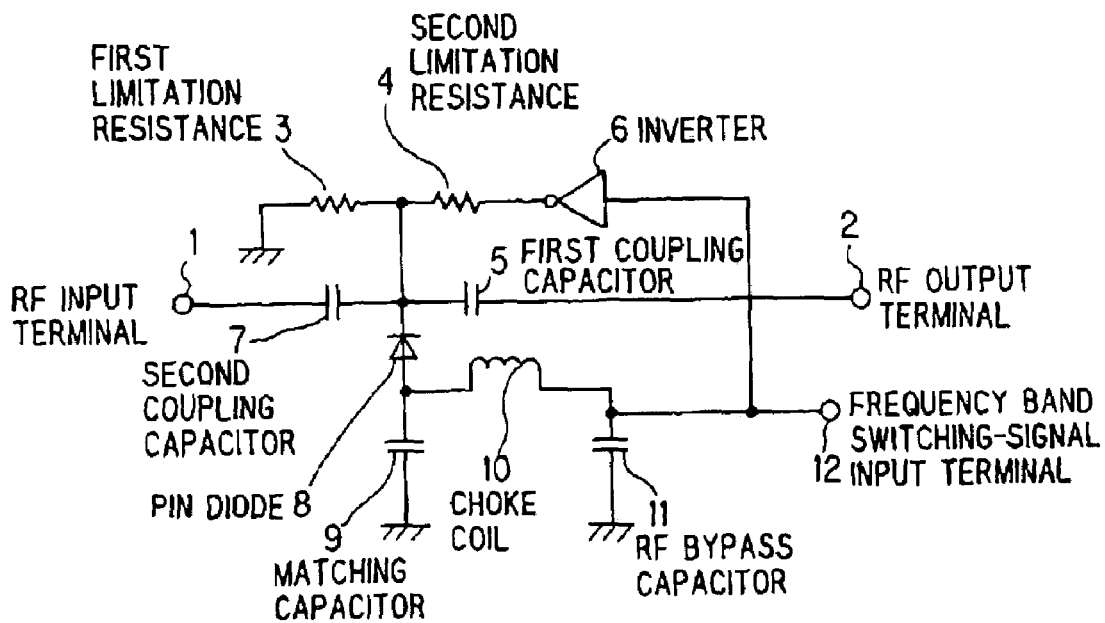
FIG. 2 is a circuit diagram showing an apparatus for switching a matching circuit in a preferred embodiment of the invention.
Figure 3:
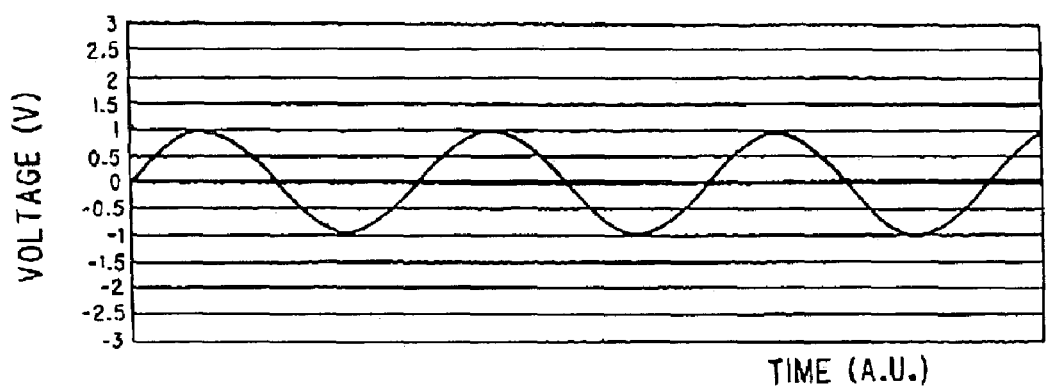
FIG. 3 is a waveform diagram showing an RF amplitude on a cathode terminal at an off-time of a PIN diode in the conventional apparatus as shown in FIG. 1.

FIG. 2 shows an apparatus for switching a matching circuit in a mobile communication terminal of the invention. The apparatus for switching a matching circuit has the same configuration in part as the conventional configuration as shown in FIG. 1.

An RF input terminal 1 is connected with an RF output terminal 2 via a first coupling capacitor 5 and a second coupling capacitor 7 to form an RF signal input and output line. A PIN diode 8 for switching a frequency band is connected in parallel between the first and second coupling capacitors 5 and 7 at its cathode to the RF signal input and output line, and a grounded limitation resistance 3 is also connected in parallel thereto.

The anode of the PIN diode 8 is connected with a matching capacitor 9 as an impedance matching element, and a choke coil 10 is connected in parallel to a midpoint of them, while an RF bypass capacitor 11 is connected in parallel to the choke coil 10 and a frequency band switching-signal input terminal 12 is connected in series thereto.

Though the above configuration is the same as the conventional configuration, a following bias circuit is added thereto in the invention.

The frequency band switching-signal input terminal 12 is connected with an input terminal of an inverter 6 comprising CMOSs, and an output terminal of the inverter 6 which inverts a signal of its input terminal is grounded via a second limitation resistance 4 by a first limitation resistance 3.

The cathode of the PIN diode 8 is connected with a connection point between these limitation resistances 3 and 4 for limiting a current flown to the PIN diode 8 and dividing a voltage from the inverter 6 and then the divided voltage is applied to the cathode of the PIN diode 8.

Operation of the apparatus including the bias circuit as shown in FIG. 2 will be explained.

Firstly, when a frequency band switching-signal which is input to the frequency band switching-signal input terminal 12 is H level, a voltage of the frequency band switching-signal is applied via the choke coil 10 as a DC voltage to the PIN diode 8, the PIN diode 8 is turned on to make an impedance between the anode and the cathode low at the RF signal.

At this time, the choke coil 10 is grounded on the side of the frequency band switching-signal input terminal 12 via the RF bypass capacitor 11, so that an RF impedance becomes high on the side of the choke coil 10 at the anode of the PIN diode 8 by setting a constant of the choke coil 10 to a large value to result in no influence on an impedance of the RF signal input and output line communicating from the RF input terminal 1 to the RF output terminal 2.

At the same time, an output signal of the inverter 6 comprising CMOSs becomes L level because the frequency band switching-signal is H level.

Therefore, a current flowing to the PIN diode 8 is decided by a total resistance of the first and second limitation resistances 3 and 4.

For example, "(3V−0.7V)/1KΩ=2.3 mA" is obtained, where a voltage of H level from the frequency band switching-signal input terminal 12 is 3V, and the first and second limitation resistances 3 and 4 are of 2 KΩ, respectively.

These constants of the first and second limitation resistances 3 and 4 are required to be enlarged fully to result in no influence on an impedance of the RF signal input and output line communicating from the RF input terminal 1 to the RF output terminal 2.

At this time, an RF amplitude on the cathode point of the PIN diode 8 has an amplitude changing on the central axis of 2.3V.

A constant of the matching capacitor 9 is decided, so that a loss of the RF signal input and output line communicating from the RF input terminal 1 to the RF output terminal 2 becomes minimum at a preselected band.

As is apparent from the foregoing description, when the frequency band switching-signal is H level, a DC voltage is applied to the PIN diode 8, so that the PIN diode 8 becomes a low impedance between the anode and the cathode at the RF signal. As a result, the impedance is optimized at a selected band, because the matching capacitor 9 is added to the RF signal input and output line communicating from the RF input terminal 1 to the RF output terminal 2.

Next, operation at the time of L level of the frequency band switching-signal input to the frequency band switching-signal input terminal 12 will be explained.

At this time, no voltage is applied to the anode of the PIN diode 8. Therefore the PIN diode 8 is turned off and an RF impedance has become high at the cathode of the PIN diode 8 so that the matching capacitor 9 is insulated from the RF signal input and output line communicating from the RF input terminal 1 to the RF output terminal 2.

At the same time, an output signal of the inverter 6 becomes H level, because the frequency band switching-signal is L level, and a voltage divided by the first and second limitation resistances 3 and 4 is applied to the cathode of the PIN diode 8.

For example, "3V/2=1.5V" is obtained, where an output voltage of the inverter 6 is 3V, and the first and second limitation resistances 3 and 4 are of 2 KΩ respectively.

Figure 4:
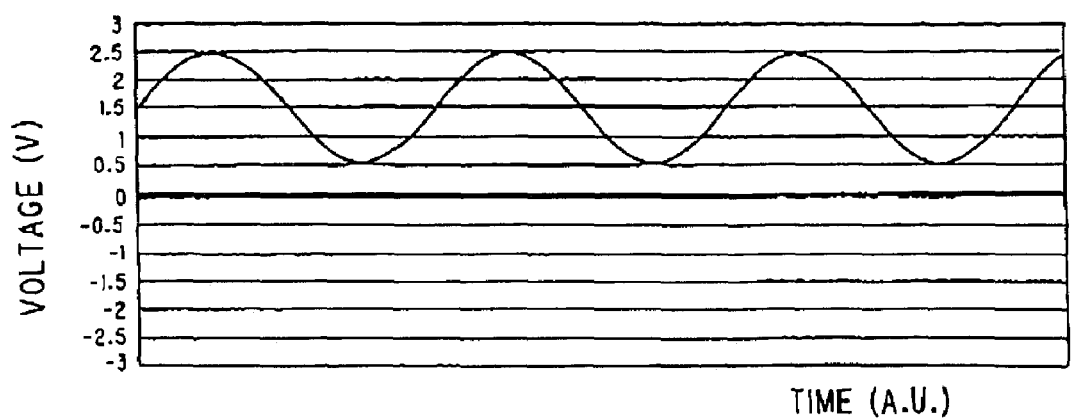
FIG. 4 is a waveform diagram showing an RF amplitude on a cathode terminal at an off-time of a PIN diode in the apparatus of the invention as shown in FIG. 2.

Therefore, the RF signal at the cathode point of the PIN diode 8 is sifted to a positive side as shown in FIG. 4 and has an amplitude changing on the central axis of 1.5V. Therefore, a frequency band can be switched precisely to avoid the turning on of the PIN diode 8 caused by an amplitude of a negative side of a transmission power.

Although the invention has been described in detail with particular reference to the preferred embodiments it will be understood that various modifications and variations can be effected within the scope of the invention as set forth in the appended claims.

What is claimed is:

1. An apparatus for switching a matching circuit in a mobile communication terminal, comprising:
    a PIN diode connected in parallel to an RF signal input and output line to be turned on and off to connect and disconnect an impedance matching-element to the RF signal input and output line in accordance with a frequency band switching-signal; and a bias circuit for generating a bias voltage applied to the PIN diode in accordance with the frequency band switching-signal, thereby shifting an amplitude of an RF signal to a positive side at an off-time of the PIN diode.

2. The apparatus for switching a matching circuit in a mobile communication terminal according to claim 1, wherein, the bias circuit comprising:
an inverter for inverting the frequency band switching-signal; and
a limitation resistance for limiting an output current of the inverter to be applied to the PIN diode.

3. The apparatus for switching a matching circuit in a mobile communication terminal according to claim 2, wherein, the bias circuit comprising:
a first limitation resistance and a second limitation resistance for dividing a voltage to be applied to a cathode of the PIN diode.

4. An apparatus for switching a matching circuit in a mobile communication terminal, comprising:
an RF signal input and output line;
a matching circuit for switching a frequency band of an RF signal;
a switching circuit for connecting and disconnecting the matching circuit to the RF signal input and output line; and a bias circuit for adding a predetermined DC voltage to the RF signal.

5. The apparatus for switching a matching circuit in a mobile communication terminal according to claim 4, wherein, the switching circuit is a PIN diode.

6. The apparatus for switching a matching circuit in a mobile communication terminal according to claim 4, wherein, the bias circuit comprising:
an inverter for inverting a frequency band switching-signal; and
a resistance for limiting an output current of the inverter to be applied to the switching circuit.

7. The apparatus for switching a matching circuit in a mobile communication terminal according to claim 5, wherein, the PIN diode is turned on and off by a frequency band switching-signal.

8. The apparatus for switching a matching circuit in a mobile communication terminal according to claim 6, wherein, the resistance comprising:
two resistances for dividing an output voltage of the inverter to be applied to the switching circuit.

* * * * *

UNITED STATES PATENT AND TRADEMARK OFFICE
CERTIFICATE OF CORRECTION

PATENT NO.        : 6,998,915 B2
APPLICATION NO.   : 10/345368
DATED             : February 14, 2006
INVENTOR(S)       : Makoto Akiya It is certified that error appears in the above-identified patent and that said Letters Patent is hereby corrected as shown below:

Col. 1, line 21, delete "B", insert --8--;
Col. 3, line 2, delete "Conjunction", insert --conjunction--;
Col. 4, line 6, delete "II", insert --H--.

Signed and Sealed this

Twentieth Day of February, 2007

JON W. DUDAS
*Director of the United States Patent and Trademark Office*